(12) United States Patent
Scott

(10) Patent No.: US 12,434,508 B2
(45) Date of Patent: Oct. 7, 2025

(54) EMERGENCY TRAILER WHEEL ASSEMBLY

(71) Applicant: William Scott, Duluth, MN (US)

(72) Inventor: William Scott, Duluth, MN (US)

( * ) Notice: Subject to any disclaimer, the term of this patent is extended or adjusted under 35 U.S.C. 154(b) by 615 days.

(21) Appl. No.: 17/890,730

(22) Filed: Aug. 18, 2022

(65) Prior Publication Data
US 2024/0059099 A1  Feb. 22, 2024

(51) Int. Cl.
| B60B 37/00 | (2006.01) |
| B60B 35/00 | (2006.01) |
| B60B 35/04 | (2006.01) |
| B62D 63/08 | (2006.01) |

(52) U.S. Cl.
CPC ........... *B60B 37/00* (2013.01); *B60B 35/006* (2013.01); *B60B 35/04* (2013.01); *B62D 63/08* (2013.01)

(58) Field of Classification Search
CPC ..... B60B 11/10; B60B 35/006; B60B 35/007; B62D 63/08; B62D 61/12; B62D 61/125; B62D 43/02; B62D 43/04; B62D 43/045; B60S 9/22; B60P 3/1033
USPC ........................ 280/767; 301/39.1, 40.2, 40.6
See application file for complete search history.

(56) References Cited

U.S. PATENT DOCUMENTS

| | | | | |
|---|---|---|---|---|
| 3,190,674 A | * | 6/1965 | Carter | B60P 3/1033 |
| | | | | 280/47.32 |
| 3,746,365 A | * | 7/1973 | Kirschbaum | B62D 61/12 |
| | | | | 254/424 |
| 4,007,949 A | * | 2/1977 | Norcia | B60B 15/00 |
| | | | | 280/767 |
| 4,611,820 A | | 9/1986 | Massey, Sr. | |
| 5,269,593 A | * | 12/1993 | Wasson | B60B 35/14 |
| | | | | 301/124.1 |
| 5,560,629 A | | 10/1996 | Allard | |
| 5,813,687 A | * | 9/1998 | Lay | B62D 21/09 |
| | | | | 280/475 |
| 6,164,679 A | * | 12/2000 | Lay | B62D 63/08 |
| | | | | 280/475 |
| 6,213,491 B1 | * | 4/2001 | Southard, Jr. | B60D 1/66 |
| | | | | 280/475 |
| 6,962,369 B2 | | 11/2005 | Hellums | |
| 7,108,336 B2 | | 9/2006 | Dombroski | |
| 2005/0017475 A1 | * | 1/2005 | Hellums | B60G 11/113 |
| | | | | 280/124.17 |
| 2015/0165851 A1 | * | 6/2015 | Dilworth | B60G 9/003 |
| | | | | 29/525.01 |

FOREIGN PATENT DOCUMENTS

| | | | | |
|---|---|---|---|---|
| GB | 2164007 A | * | 3/1986 | B60G 5/01 |
| GB | 2320001 A | * | 6/1998 | B60D 1/66 |
| WO | WO2017214667 | | 12/2017 | |

* cited by examiner

*Primary Examiner* — Christopher B Wehrly

(57) ABSTRACT

An emergency trailer wheel assembly for temporarily replacing a trailer wheel includes a frame member with a mounting bracket attached on a first end of the frame member and configured for attaching to a leaf spring of a trailer and a wheel rotatably attached to a second end of the frame member.

7 Claims, 4 Drawing Sheets

EMERGENCY TRAILER WHEEL ASSEMBLY

BACKGROUND OF THE INVENTION

(1) Field of the Invention

The disclosure relates to spare wheel assemblies and more particularly pertains to a new spare wheel assembly for temporarily replacing a trailer wheel.

(2) Description of Related Art Including Information Disclosed Under 37 CFR 1.97 and 1.98

Boat trailer wheels are particularly susceptible to breakage due to being occasionally submerged under water, which corrodes metal components and causes bearing lubricant to leak or perform poorly. As a result, an entire spare wheel assembly, rather than simply a spare tire, is often needed in the case of a broken trailer wheel. The prior art discloses spare wheel assemblies to solve this problem, including a first device which attaches a retractable wheel to the frame of the trailer and a second device which releasably couples a spare wheel assembly to the frame of the trailer by surrounding an outer surface of a member of the frame with the wheel being positioned underneath the trailer.

The most pertinent device disclosed in the prior art is the one in U.S. Pat. No. 6,962,369 B2 (the '369 patent), which couples a structural member to a leaf spring of the trailer via two clamping brackets. Further, this invention discloses that the brackets are coupled to the leaf spring on opposite sides of the trailer's axle and pivotably coupled to the structural member, with the spare wheel attached to an end of the structural member. The pivoting connections would likely be necessary to eliminate any relative angular deflections in the brackets that would occur due to being coupled to a bending leaf spring of a trailer.

This device and the prior art generally do not disclose a device which clamps a frame member to a leaf spring at one location and extends away from the trailer to a rotatably coupled wheel at an end of the frame member. Such a structure would avoid the need for pivoting connections and provides greater opportunities for avoiding interferences with components of the trailer near the leaf spring.

BRIEF SUMMARY OF THE INVENTION

An embodiment of the disclosure meets the needs presented above by generally comprising a frame member with a mounting bracket attached on a first end of the frame member and configured for attaching to a leaf spring of a trailer and a wheel rotatably attached to a second end of the frame member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
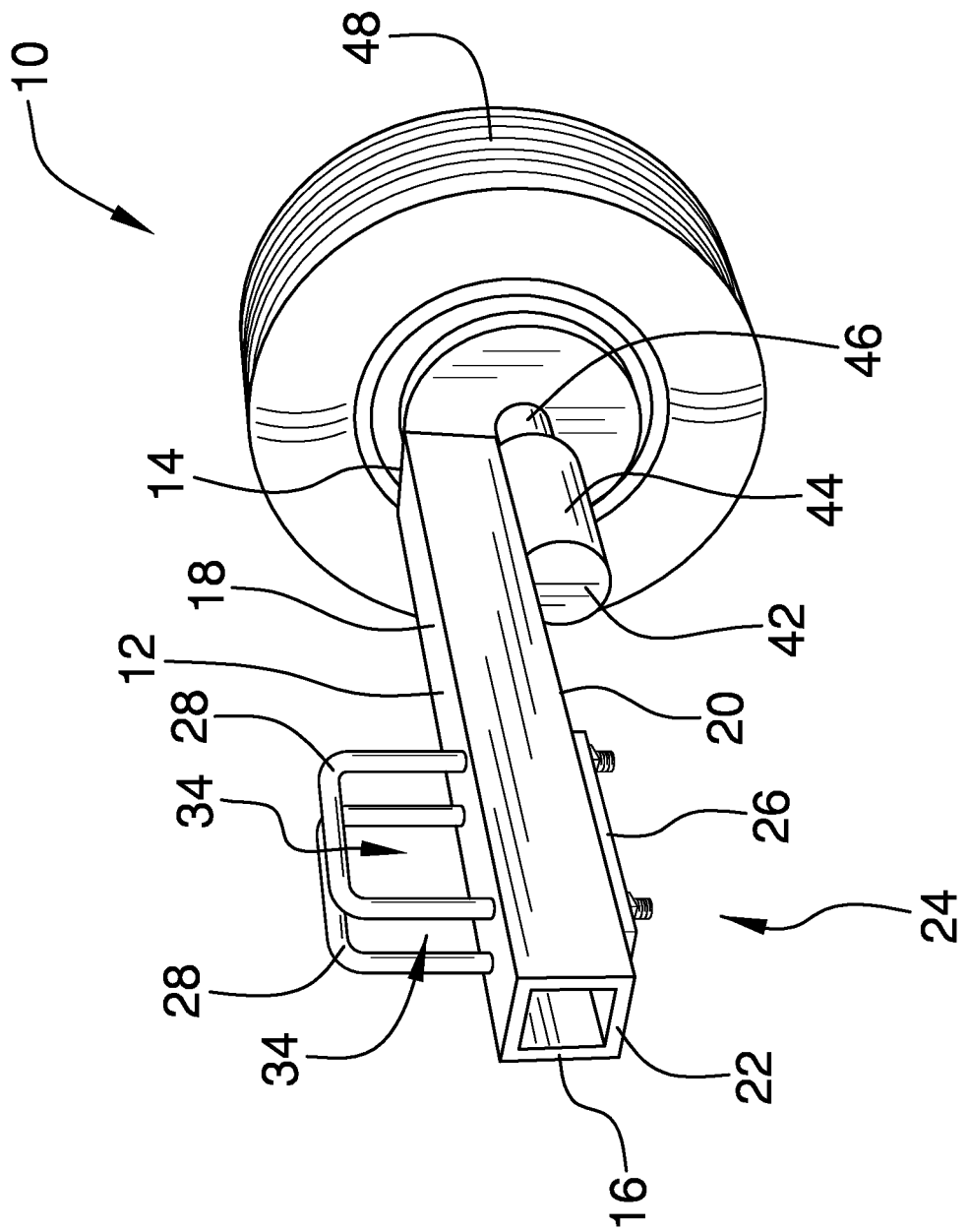
FIG. 1 is a top front side perspective view of an emergency trailer wheel assembly according to an embodiment of the disclosure.
Figure 2:
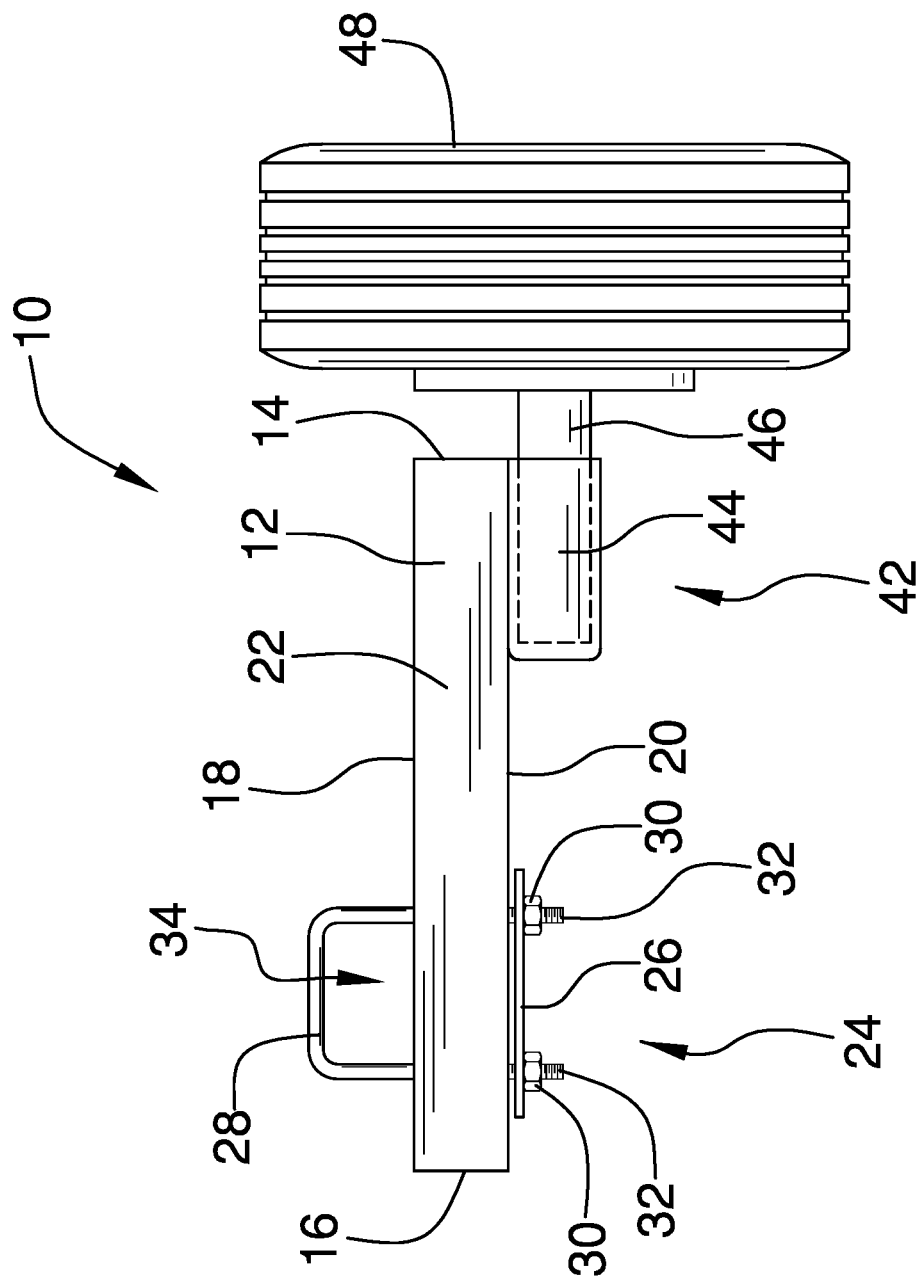
FIG. 2 is a front view of an embodiment of the disclosure.
Figure 3:
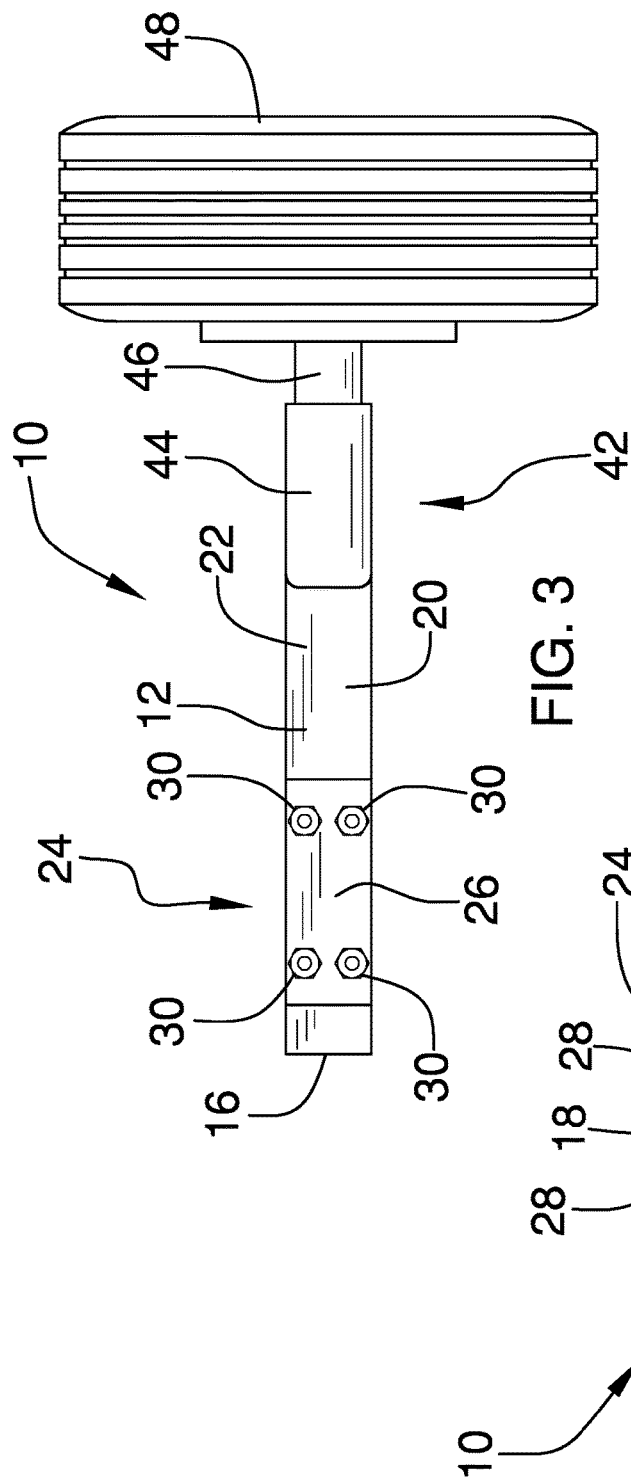
FIG. 3 is a bottom view of an embodiment of the disclosure.
Figure 4:
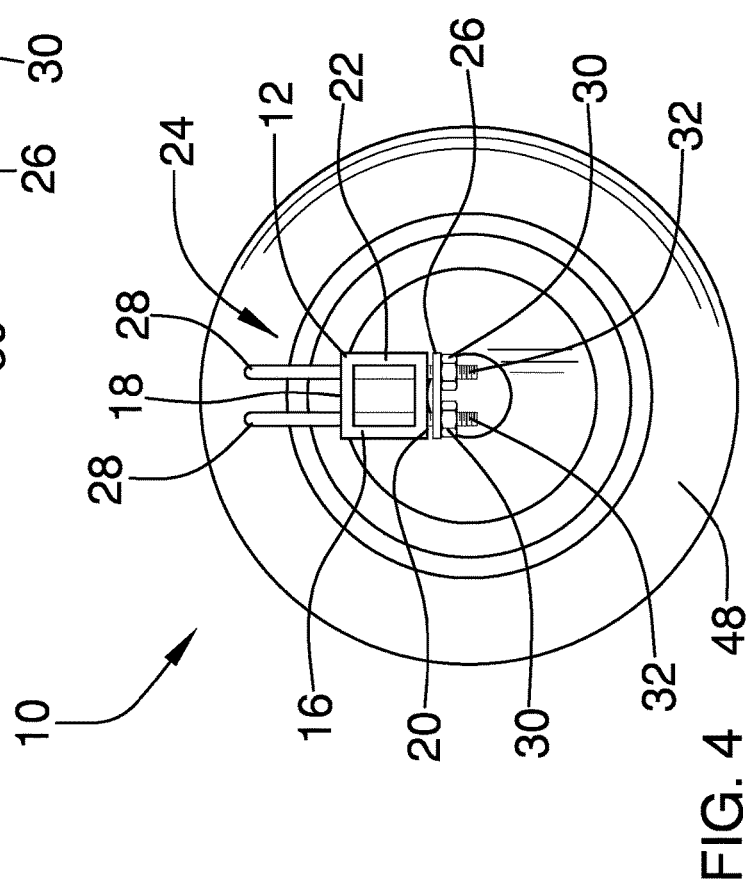
FIG. 4 is a side view of an embodiment of the disclosure.
Figure 5:
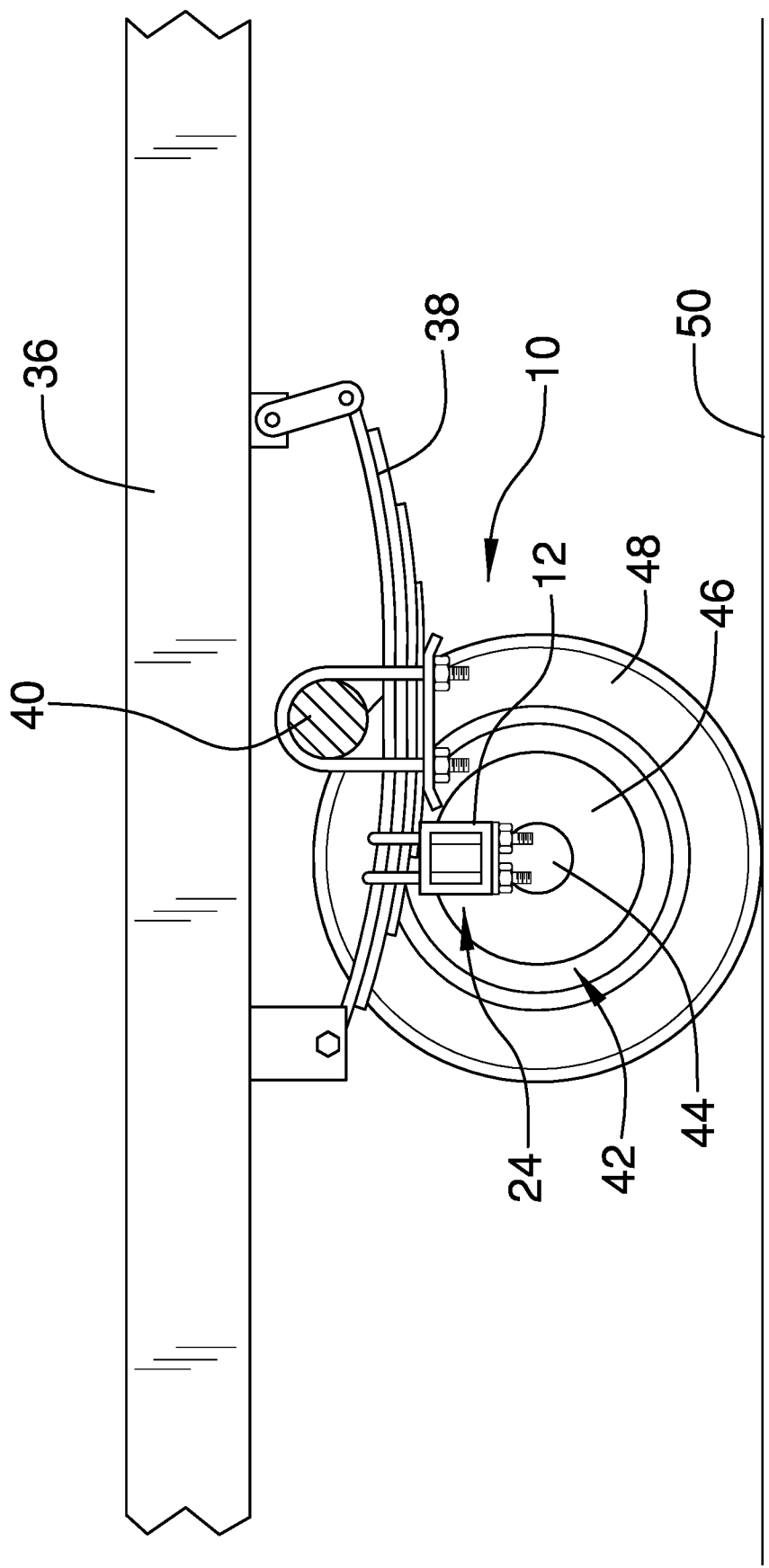
FIG. 5 is an in-use view of an embodiment of the disclosure.

With reference now to the drawings, and in particular to FIGS. 1 through 5 thereof, a new spare wheel assembly embodying the principles and concepts of an embodiment of the disclosure and generally designated by the reference numeral 10 will be described.

As best illustrated in FIGS. 1 through 5, the emergency trailer wheel assembly generally comprises a frame member 12 having a first end 14 and a second end 16, the frame member 12 being elongate between the first end 14 and the second end 16. The frame member 12 has a top side 18 and a bottom side 20, each which extending between the first end 14 and the second end 16. The frame member 12 is formed of a square tube 22.

A mounting bracket 24 comprises a plate 26, a pair of U-bolts 28, and a plurality of nuts 30. The plate 26 is positioned in abutment with the bottom side 20 of the frame member 12 proximate a first end 14 of the frame member 12. Each U-bolt 28 has two threaded portions 32 extending through each of the top side 18 of the frame member 12 and the bottom side 20 of the frame member 12. Each U-bolt 28 cooperates with the top side 18 of the frame member 12 to define an associated aperture 34 of a pair of apertures 34, wherein the mounting bracket 24 is configured to receive a leaf spring 38 of a trailer 36 through the pair of apertures 34 such that the leaf spring 38 extends laterally from the frame member 12. Each nut 30 threads onto each threaded portion 32 of each U-bolt 28 and is positioned in abutment with the plate 26, wherein the mounting bracket 24 is configured for clamping to the leaf spring 38 when the leaf spring 38 extends through the pair of apertures 34 such that the frame member 12 extends away from the trailer 36 proximate to and parallel to an axle 40 of the trailer 36. The mounting bracket 24 may have a first clamping member coupled to the frame member 12 proximate the first end 14. The mounting bracket 24 may have a second clamping member movable toward and away from the first clamping member. The mounting bracket 24 is configured for clamping the leaf spring 38 of the trailer 36 between the first clamping member and the second clamping member such that the frame member 12 extends away from the trailer 36 proximate to and parallel to the axle 40 of the trailer 36.

A stub axle 42 comprises a frame portion 44 and a wheel portion 46 rotatably coupled to the frame portion 44. The frame portion 44 is coupled to the bottom side 20 of the frame member 12 such that the wheel portion 46 extends away from the second end 16 of the frame member 12. The wheel portion 46 is rotatable about a rotational axis parallel to a central longitudinal axis of the frame member 12. A wheel 48 is coupled to the wheel portion 46 of the stub axle 42.

In use, the mounting bracket 24 clamps to the leaf spring 38 of the trailer 36, thereby securing the assembly 10 to the trailer 36 such that the wheel 48 supports the trailer 36 on a road surface 50 and rotates about the rotational axis parallel to the axle 40 of the trailer 36. This use allows the trailer 36 to be towed until the trailer 36 can be repaired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency trailer wheel assembly comprising:
    a frame member having a first end and a second end, said frame member being elongate between said first end and said second end, said frame member having a top side and a bottom side, each of said top side and said bottom side extending between said first end and said second end;
    a mounting bracket comprising a plate, a pair of U-bolts, and a plurality of nuts, said plate being positioned in abutment with said bottom side of said frame member proximate the first end of said frame member, each said U-bolt having two threaded portions extending through each of said top side of said frame member and said bottom side of said frame member, each said U-bolt cooperating with said top side of said frame member to define an associated aperture of a pair of apertures, said mounting bracket being configured to receive a leaf spring of a trailer through said pair of apertures such that the leaf spring extends laterally from said frame member, each said nut threading onto each said threaded portion of each said U-bolt, each said nut being positioned in abutment with said plate, said mounting bracket being configured for clamping to the leaf spring when said leaf spring extends through said pair of apertures such that the frame member extends away from the trailer proximate to and parallel to an axle of the trailer; and
    a wheel being rotatably coupled to said frame member proximate said second end of said frame member.

2. The assembly of claim 1, further comprising said frame member being formed of a square tube.

3. The assembly of claim 1, further comprising a stub axle, said stub axle comprising a frame portion and a wheel portion, said wheel portion being rotatably coupled to said frame portion, said frame portion being coupled to said frame member, said wheel portion extending away from said second end of said frame member, said wheel being coupled to said wheel portion of said stub axle.

4. The assembly of claim 3, further comprising said wheel portion being rotatable about a rotational axis parallel to a central longitudinal axis of said frame member.

5. The assembly of claim 1, further comprising a stub axle comprising a frame portion and a wheel portion, said wheel portion being rotatably coupled to said frame portion, said frame portion being coupled to said bottom side of said frame member, said wheel portion extending away from said second end of said frame member, said wheel being coupled to said wheel portion of said stub axle.

6. The assembly of claim 5, further comprising said wheel portion is rotatable about a rotational axis parallel to a central longitudinal axis of said frame member.

7. An emergency trailer wheel assembly comprising:
    a frame member having a first end and a second end, said frame member being elongate between said first end and said second end, said frame member having a top side and a bottom side, each of said top side and said bottom side extending between said first end and said second end, said frame member being formed of a square tube;
    a mounting bracket comprising a plate, a pair of U-bolts, and a plurality of nuts, said plate being positioned in abutment with said bottom side of said frame member proximate the first end of said frame member, each said U-bolt having two threaded portions extending through each of said top side of said frame member and said bottom side of said frame member, each said U-bolt cooperating with said top side of said frame member to define an associated aperture of a pair of apertures, said mounting bracket being configured to receive a leaf spring of a trailer through said pair of apertures such that the leaf spring extends laterally from said frame member, each said nut threading onto each said threaded portion of each said U-bolt, each said nut being positioned in abutment with said plate, said mounting bracket being configured for clamping to the leaf spring when said leaf spring extends through said pair of apertures such that the frame member extends away from the trailer proximate to and parallel to an axle of the trailer; a stub axle comprising a frame portion and a wheel portion, said wheel portion being rotatably coupled to said frame portion, said frame portion being coupled to said bottom side of said frame member, said wheel portion extending away from said second end of said frame member such that said wheel portion is rotatable about a rotational axis parallel to a central longitudinal axis of said frame member; and
    a wheel being coupled to said wheel portion of said stub axle.

* * * * *